United States Patent
Lee et al.

(10) Patent No.: US 7,868,689 B2
(45) Date of Patent: Jan. 11, 2011

(54) LOW POWER SLICER-BASED DEMODULATOR FOR PPM

(75) Inventors: Chong U. Lee, San Diego, CA (US); Amal Ekbal, San Diego, CA (US); David Jonathan Julian, San Diego, CA (US); Jun Shi, San Diego, CA (US); Supisa Lerstaveesin, Bangkok (TH)

(73) Assignee: QUALCOMM Incorporated, San Diego, CA (US)

( * ) Notice: Subject to any disclaimer, the term of this patent is extended or adjusted under 35 U.S.C. 154(b) by 241 days.

(21) Appl. No.: 12/099,686

(22) Filed: Apr. 8, 2008

(65) Prior Publication Data
US 2009/0251208 A1 Oct. 8, 2009

(51) Int. Cl.
H03K 9/04 (2006.01)

(52) U.S. Cl. ........................ 329/313; 375/340

(58) Field of Classification Search .............. 329/311, 329/313, 314, 312; 375/237, 238, 239, 340, 375/341, 342, 343
See application file for complete search history.

(56) References Cited

U.S. PATENT DOCUMENTS

| | | | |
|---|---|---|---|
| 4,866,738 A * | 9/1989 | Wiesmann et al. ......... 375/239 |
| 5,687,169 A | 11/1997 | Fullerton | |
| 5,727,022 A * | 3/1998 | Schafer et al. ............. 375/238 |
| 5,764,696 A | 6/1998 | Barnes et al. | |
| 5,812,081 A | 9/1998 | Fullerton | |
| 5,832,035 A | 11/1998 | Fullerton | |
| 5,907,427 A | 5/1999 | Scalora et al. | |
| 5,952,956 A | 9/1999 | Fullerton | |
| 5,960,031 A | 9/1999 | Fullerton et al. | |
| 5,963,581 A | 10/1999 | Fullerton et al. | |
| 5,969,663 A | 10/1999 | Fullerton et al. | |
| 5,995,534 A | 11/1999 | Fullerton et al. | |
| 6,031,862 A | 2/2000 | Fullerton et al. | |
| 6,091,374 A | 7/2000 | Barnes | |
| 6,111,536 A | 8/2000 | Richards et al. | |
| 6,133,876 A | 10/2000 | Fullerton et al. | |
| 6,177,903 B1 | 1/2001 | Fullerton et al. | |
| 6,218,979 B1 | 4/2001 | Barnes et al. | |
| 6,295,019 B1 | 9/2001 | Richards et al. | |
| 6,297,773 B1 | 10/2001 | Fullerton et al. | |

(Continued)

FOREIGN PATENT DOCUMENTS

WO WO2006098701 A1 9/2006
WO WO 2006098701 A1 * 9/2006

OTHER PUBLICATIONS

International Search Report & Written Opinion—PCT/US2008/059948 International Search Authority—European Patent Office—Feb. 19, 2009.

(Continued)

*Primary Examiner*—Robert Pascal
*Assistant Examiner*—Ryan Johnson
(74) *Attorney, Agent, or Firm*—Dang M. Vo (57) ABSTRACT

An apparatus and method for communications is disclosed. The apparatus includes a slicer configured to generate samples of a signal carrying information, and a demodulator having a digital integrator configured to integrate the samples, the demodulator being further configured to recover from the integrated samples data representative of the information carried by the signal.

37 Claims, 4 Drawing Sheets

U.S. PATENT DOCUMENTS

| | | |
|---|---|---|
| 6,300,903 B1 | 10/2001 | Richards et al. |
| 6,304,623 B1 | 10/2001 | Richards et al. |
| 6,351,652 B1 | 2/2002 | Finn et al. |
| 6,354,946 B1 | 3/2002 | Finn |
| 6,400,307 B2 | 6/2002 | Fullerton et al. |
| 6,400,329 B1 | 6/2002 | Barnes |
| 6,421,389 B1 | 7/2002 | Jett et al. |
| 6,430,208 B1 | 8/2002 | Fullerton et al. |
| 6,437,756 B1 | 8/2002 | Schantz |
| 6,462,701 B1 | 10/2002 | Finn |
| 6,466,125 B1 | 10/2002 | Richards et al. |
| 6,469,628 B1 | 10/2002 | Richards et al. |
| 6,483,461 B1 | 11/2002 | Matheney et al. |
| 6,489,893 B1 | 12/2002 | Richards et al. |
| 6,492,904 B2 | 12/2002 | Richards |
| 6,492,906 B1 | 12/2002 | Richards et al. |
| 6,501,393 B1 | 12/2002 | Richards et al. |
| 6,504,483 B1 | 1/2003 | Richards et al. |
| 6,512,455 B2 | 1/2003 | Finn et al. |
| 6,512,488 B2 | 1/2003 | Schantz |
| 6,519,464 B1 | 2/2003 | Santhoff et al. |
| 6,529,568 B1 | 3/2003 | Richards et al. |
| 6,538,615 B1 | 3/2003 | Schantz |
| 6,539,213 B1 | 3/2003 | Richards et al. |
| 6,549,567 B1 | 4/2003 | Fullerton |
| 6,552,677 B2 | 4/2003 | Barnes et al. |
| 6,556,621 B1 | 4/2003 | Richards et al. |
| 6,560,463 B1 | 5/2003 | Santhoff |
| 6,571,089 B1 | 5/2003 | Richards et al. |
| 6,573,857 B2 | 6/2003 | Fullerton et al. |
| 6,577,691 B2 | 6/2003 | Richards et al. |
| 6,585,597 B2 | 7/2003 | Finn |
| 6,593,886 B2 | 7/2003 | Schantz |
| 6,606,051 B1 | 8/2003 | Fullerton et al. |
| 6,611,234 B2 | 8/2003 | Fullerton et al. |
| 6,614,384 B2 | 9/2003 | Hall et al. |
| 6,621,462 B2 | 9/2003 | Barnes |
| 6,636,566 B1 | 10/2003 | Roberts et al. |
| 6,636,567 B1 | 10/2003 | Roberts et al. |
| 6,636,573 B2 | 10/2003 | Richards et al. |
| 6,642,903 B2 | 11/2003 | Schantz |
| 6,661,342 B2 | 12/2003 | Hall et al. |
| 6,667,724 B2 | 12/2003 | Barnes et al. |
| 6,670,909 B2 | 12/2003 | Kim |
| 6,671,310 B1 | 12/2003 | Richards et al. |
| 6,674,396 B2 | 1/2004 | Richards et al. |
| 6,677,796 B2 | 1/2004 | Brethour et al. |
| 6,700,538 B1 | 3/2004 | Richards |
| 6,710,736 B2 | 3/2004 | Fullerton et al. |
| 6,717,992 B2 | 4/2004 | Cowie et al. |
| 6,748,040 B1 | 6/2004 | Johnson et al. |
| 6,750,757 B1 | 6/2004 | Gabig, Jr. et al. |
| 6,759,948 B2 | 7/2004 | Grisham et al. |
| 6,760,387 B2 | 7/2004 | Langford et al. |
| 6,762,712 B2 | 7/2004 | Kim |
| 6,763,057 B1 | 7/2004 | Fullerton et al. |
| 6,763,282 B2 | 7/2004 | Glenn et al. |
| 6,774,846 B2 | 8/2004 | Fullerton et al. |
| 6,774,859 B2 | 8/2004 | Schantz et al. |
| 6,778,603 B1 | 8/2004 | Fullerton et al. |
| 6,781,530 B2 | 8/2004 | Moore |
| 6,782,048 B2 | 8/2004 | Santhoff |
| 6,788,730 B1 | 9/2004 | Richards et al. |
| 6,822,604 B2 | 11/2004 | Hall et al. |
| 6,823,022 B1 * | 11/2004 | Fullerton et al. ............ 375/285 |
| 6,836,223 B2 | 12/2004 | Moore |
| 6,836,226 B2 | 12/2004 | Moore |
| 6,845,253 B1 | 1/2005 | Schantz |
| 6,847,675 B2 | 1/2005 | Fullerton et al. |
| 6,879,878 B2 | 4/2005 | Glenn et al. |
| 6,882,301 B2 | 4/2005 | Fullerton |
| 6,895,034 B2 | 5/2005 | Nunally et al. |
| 6,900,732 B2 | 5/2005 | Richards |
| 6,906,625 B1 | 6/2005 | Taylor et al. |
| 6,907,244 B2 | 6/2005 | Santhoff et al. |
| 6,912,240 B2 | 6/2005 | Kumar et al. |
| 6,914,949 B2 | 7/2005 | Richards et al. |
| 6,917,284 B2 | 7/2005 | Grisham et al. |
| 6,919,838 B2 | 7/2005 | Santhoff |
| 6,922,166 B2 | 7/2005 | Richards et al. |
| 6,922,177 B2 | 7/2005 | Barnes et al. |
| 6,925,109 B2 | 8/2005 | Richards et al. |
| 6,933,882 B2 | 8/2005 | Fullerton |
| 6,937,639 B2 | 8/2005 | Pendergrass et al. |
| 6,937,663 B2 | 8/2005 | Jett et al. |
| 6,937,667 B1 | 8/2005 | Fullerton et al. |
| 6,937,674 B2 | 8/2005 | Santhoff et al. |
| 6,947,492 B2 | 9/2005 | Santhoff et al. |
| 6,950,485 B2 | 9/2005 | Richards et al. |
| 6,954,480 B2 | 10/2005 | Richards et al. |
| 6,959,031 B2 | 10/2005 | Haynes et al. |
| 6,959,032 B1 | 10/2005 | Richards et al. |
| 6,963,727 B2 | 11/2005 | Shreve |
| 6,980,613 B2 | 12/2005 | Krivokapic |
| 6,989,751 B2 | 1/2006 | Richards |
| 7,015,793 B2 | 3/2006 | Gabig, Jr. et al. |
| 7,020,224 B2 | 3/2006 | Krivokapic |
| 7,027,425 B1 | 4/2006 | Fullerton et al. |
| 7,027,483 B2 | 4/2006 | Santhoff et al. |
| 7,027,493 B2 | 4/2006 | Richards |
| 7,030,806 B2 | 4/2006 | Fullerton |
| 7,042,417 B2 | 5/2006 | Santhoff et al. |
| 7,046,187 B2 | 5/2006 | Fullerton et al. |
| 7,046,618 B2 | 5/2006 | Santhoff et al. |
| 7,054,361 B1 * | 5/2006 | Otte et al. ................... 375/239 |
| 7,069,111 B2 | 6/2006 | Glenn et al. |
| 7,075,476 B2 | 7/2006 | Kim |
| 7,079,827 B2 | 7/2006 | Richards et al. |
| 7,099,367 B2 | 8/2006 | Richards et al. |
| 7,099,368 B2 | 8/2006 | Santhoff et al. |
| 7,129,886 B2 | 10/2006 | Hall et al. |
| 7,132,975 B2 | 11/2006 | Fullerton et al. |
| 7,145,954 B1 | 12/2006 | Pendergrass et al. |
| 7,148,791 B2 | 12/2006 | Grisham et al. |
| 7,151,490 B2 | 12/2006 | Richards |
| 7,167,525 B2 | 1/2007 | Santhoff et al. |
| 7,170,408 B2 | 1/2007 | Taylor et al. |
| 7,184,938 B1 | 2/2007 | Lansford et al. |
| 7,190,722 B2 | 3/2007 | Lakkis et al. |
| 7,190,729 B2 | 3/2007 | Siwiak |
| 7,206,334 B2 | 4/2007 | Siwiak |
| 7,209,724 B2 | 4/2007 | Richards et al. |
| 7,221,215 B2 | 5/2007 | Shimazaki et al. |
| 7,230,980 B2 | 6/2007 | Langford et al. |
| 7,239,277 B2 | 7/2007 | Fullerton et al. |
| RE39,759 E | 8/2007 | Fullerton |
| 7,256,727 B2 | 8/2007 | Fullerton et al. |
| 7,271,779 B2 | 9/2007 | Hertel |
| 7,436,916 B2 | 10/2008 | Akahori et al. |
| 7,610,083 B2 * | 10/2009 | Drew et al. ................ 600/509 |
| 2005/0141605 A1 * | 6/2005 | Akahori et al. ............ 375/239 |
| 2006/0287745 A1 * | 12/2006 | Richenstein et al. .......... 700/94 |

OTHER PUBLICATIONS

Marco Crepaldi et al: "A 1-bit Synchronization Algorithm for a Reduced Complexity Energy Detection UWB Receiver" Ultra-Wideband, 2007. ICUWB 2007. IEEE International Conference on, IEEE, PI, Sep. 1, 2007, pp. 703-708, XP031159442 ISBN: 978-1-4244-0520-6 p. 703, right-hand column, last full paragraph figure 1.

* cited by examiner

LOW POWER SLICER-BASED DEMODULATOR FOR PPM

BACKGROUND

1. Field

The present disclosure relates generally to communication systems, and more particularly, to concepts and techniques for slicer-based demodulation.

2. Background

Peer-to-peer networks are commonly used for connecting wireless devices via adhoc connections. These networks differ from the traditional client-server model where communications are usually with a central server. A peer-to-peer network has only equal peer devices that communicate directly with one another. Such networks are useful for many purposes. A peer-to-peer network may be used, for example, as a consumer electronic wire replacement system for short range or indoor applications. These networks are sometimes referred to as Wireless Personal Area Networks (WPAN) and are useful for efficiently transferring video, audio, voice, text, and other media between wireless devices over a short distance.

A WPAN may provide connectivity for devices in a home or a small office or may be used to provide connectivity for devices carried by a person. In a typical scenario, a WPAN may provide connectivity for devices within a range on the order of 10 s of meters. In some applications, a portable device such as a cell phone may communicate with a headset using, by way of example, pulsed-Ultra Wide-Band (UWB) communications. Devices that consume relatively small amounts of power are generally desirable in these and other types of applications. Low power consumption in such devices allows for a small battery size and/or prolonged battery life, for example.

To this end, physical layer design approaches implementing pulsed-UWB technologies with Pulse Position Modulation (PPM), by way of example, have been utilized for low power and low complexity system design. However, the RF design required to implement such architectures faces significant challenges, such as those that stem from the analog energy detector-based PPM demodulator. Therefore, there is a need for a much simpler, low power consumption design approach.

SUMMARY

In one aspect of the disclosure, an apparatus for wireless communications includes a slicer configured to generate samples of a signal carrying information, and a demodulator having a digital integrator configured to integrate the samples, the demodulator being further configured to recover from the integrated samples data representative of the information carried by the signal.

In another aspect of the disclosure, a method of wireless communications includes generating samples of a signal carrying information, integrating the samples, and recovering from the integrated samples data representative of the information carried by the signal.

In yet another aspect of the disclosure, an apparatus for wireless communications includes means for generating samples of a signal carrying information, and means for digitally integrating the samples, and means for the recovering, from the integrated samples, data representative of the information carried by the signal.

In a further aspect of the disclosure, a computer-program product for wireless communications includes computer-readable medium comprising codes executable, for example, by at least one processor to integrate samples of a signal carrying information and recover from the integrated samples data representative of the information carried by the signal.

In yet a further aspect of the disclosure, a node includes an analog front end configured to receive a signal carrying information, a slicer configured to generate samples of the signal, and a demodulator having a digital integrator configured to integrate the samples, the demodulator being further configured to recover from the integrated samples data representative of the information carried by the signal.

It is understood that other aspects of the invention will become readily apparent to those skilled in the art from the following detailed description, wherein it is shown and described only various aspects of the invention by way of illustration. As will be realized, the invention is capable of other and different aspects and its several details are capable of modification in various other respects, all without departing from the scope of the invention. Accordingly, the drawings and detailed description are to be regarded as illustrative in nature and not as restrictive.

BRIEF DESCRIPTION OF THE DRAWINGS

Various aspects of the present disclosure are illustrated by way of example, and not by way of limitation, in the accompanying drawings, wherein.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. An aspect may comprise one or more elements of a claim.

Several aspects of a receiver will now be presented. The receiver may be part of a user device, such as a mobile telephone, a personal digital assistant (PDA), a laptop computer, a modem, a camera, a game console, a digital audio player, or any other suitable video, audio, and/or data device. Alternatively, the receiver may be part of an access point that provides access to other nodes a wireless network (e.g., a WPAN). In many applications, the receiver may be part of a device that transmits as well as receives. Such a device would therefore require a transmitter, which may be a separate component or integrated with the receiver into a single component known as a "transceiver." As those skilled in the art will readily appreciate, the various concepts described throughout this disclosure are applicable to any suitable receiver function, regardless of whether the receiver is a stand-alone device, integrated into a transceiver, or part of a node in a wireless communications system.

In the following detailed description, various aspects of a receiver will be described in the context of a pulsed-UWB system. UWB is a technology for providing high speed communications over an extremely wide bandwidth. Because pulsed-UWB signals are transmitted in very short pulses that consume very little power, this technology is well suited for WPAN applications. However, as those skilled in the art will readily appreciate, the various aspects presented throughout this disclosure are likewise applicable to receivers for various other wireless communication systems. Accordingly, any reference to a pulsed-UWB system is intended only to illustrate various aspects, with the understanding that such aspects have a wide range of applications. By way of example, various aspects disclosed throughout this disclosure may be applied to receivers for Bluetooth, 802.11, and other wireless technologies.

Figure 1:
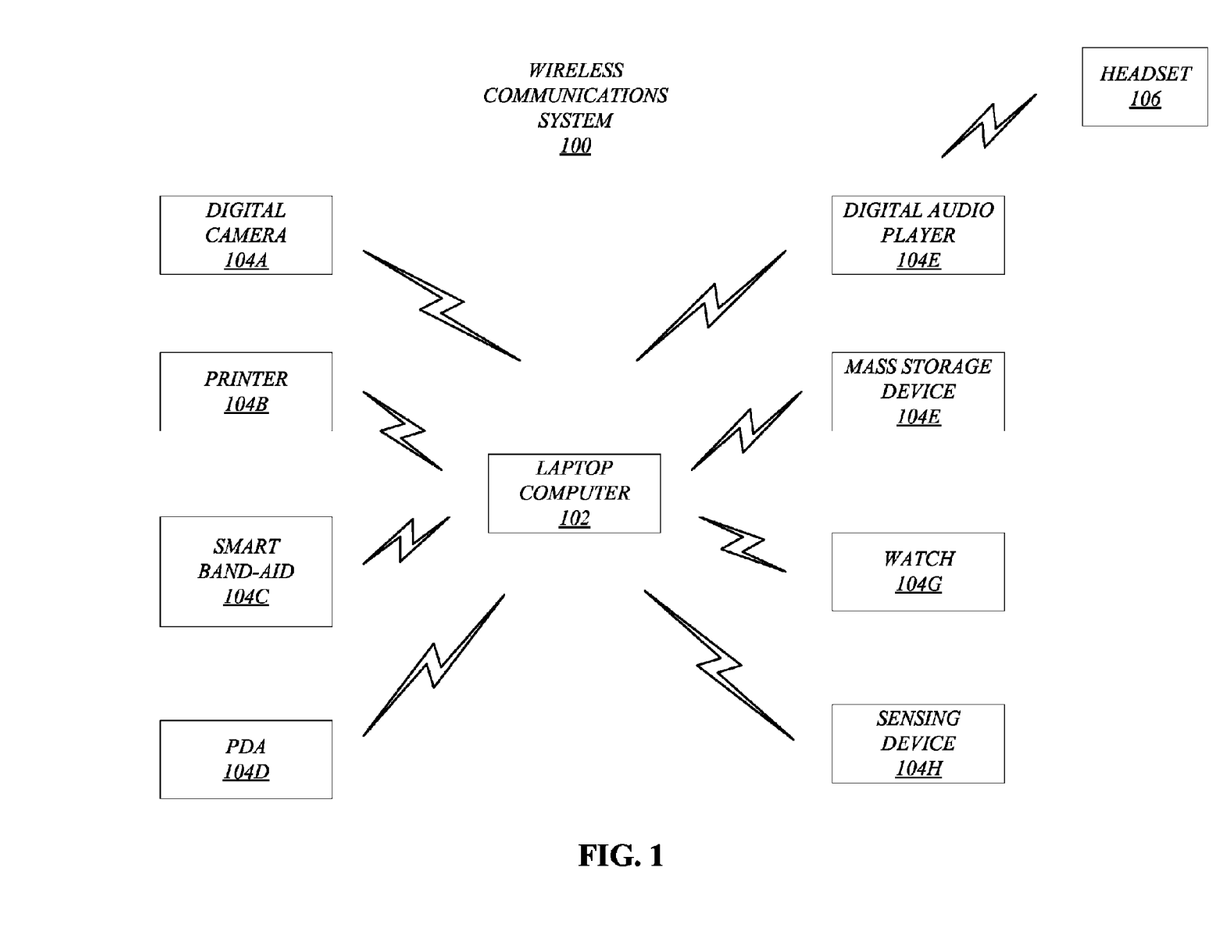
FIG. 1 is a conceptual diagram illustrating an example of a wireless communications system.

An example of a wireless communications system will now be presented with reference to FIG. 1. The wireless communications system 100 is shown with a laptop computer 102 in communication with various other wireless nodes 104. In this example, the computer 102 may receive digital photos from a digital camera 104A, send documents to a printer 104B for printing, communicate with a smart band-aid 104C, synch-up with e-mail on a Personal Digital Assistant (PDA) 104D, transfer music files to a digital audio player (e.g., MP3 player) 104E, back up data and files to a mass storage device 104F, set the time on a watch 104G, and receive data from a sensing device 104H (e.g., a medical device such as a biometric sensor, a heart rate monitor, a pedometer, an EKG device, etc.). Also shown is a headset 106 (e.g., headphones, earpiece, etc.) that receives audio from the digital audio player 104E.

In one configuration of the wireless communications system 100, the computer 102 provides an access point to a Wide Area Network (WAN) (i.e., a wireless network covering a regional, nationwide, or even a global region). One common example of a WAN is the Internet. Another example of a WAN is a cellular network that supports CDMA2000, a telecommunications standard that uses Code Division Multiple Access (CDMA) to send voice, data, and signaling between mobile subscribers. A cellular network is sometimes referred to as a Wireless Wide Area Network (WWAN). Another example of a WWAN is a cellular network that provides broadband Internet access to mobile subscribers, such as Evolution-Data Optimized (EV-DO) or Ultra Mobile Broadband (UMB), both of which are part of the CDMA2000 family of air interface standards. Alternatively, or in addition to, the computer 102 may have a UWB connection to an Ethernet modem, or some other interface to a Local Area Network (LAN) (i.e., a network generally covering tens to a few hundred meters in homes, offices buildings, coffee shops, transportation hubs, hotels, etc.).

Figure 2A:
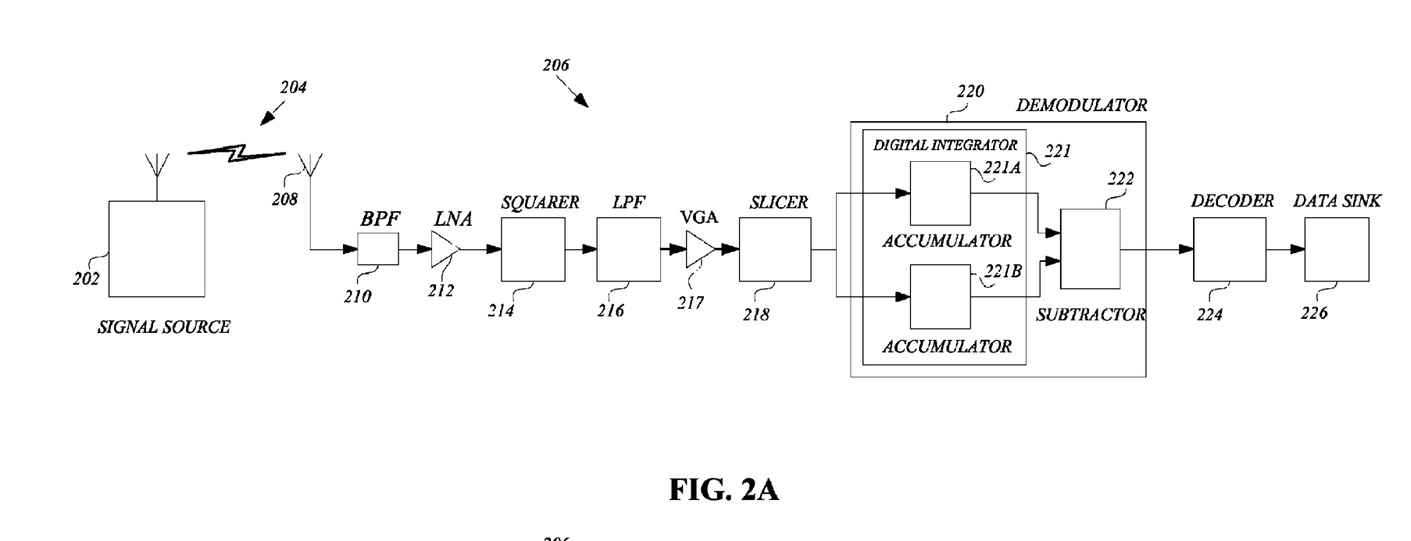
FIGS. 2A and 2B are schematic block diagrams illustrating examples of a receiving component including a slicer-based demodulator.
Figure 2B:
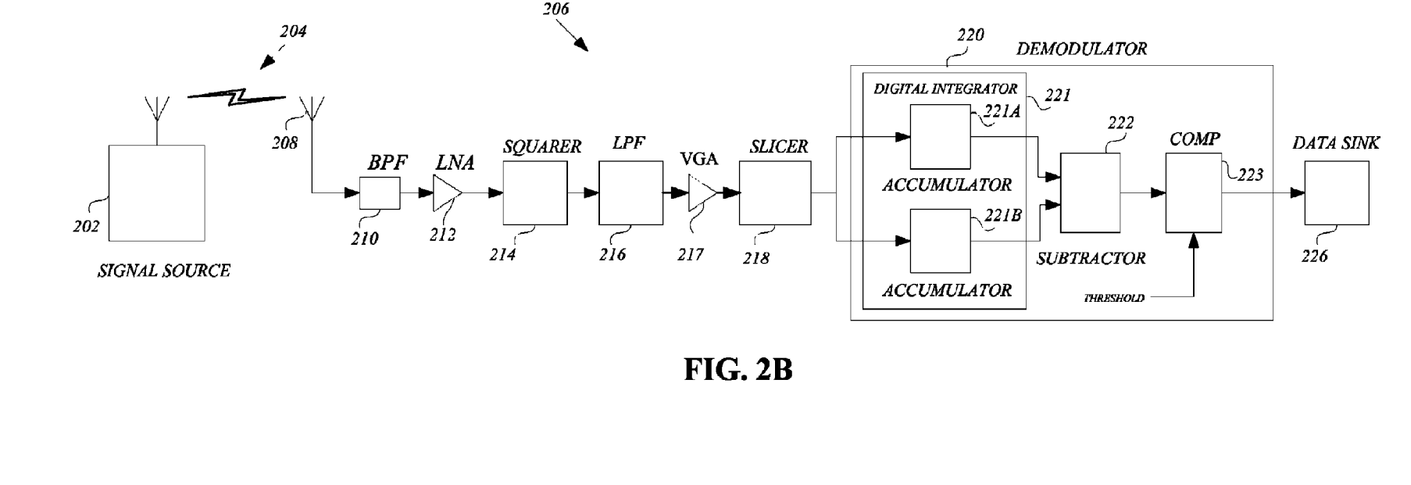

Several examples of a receiver suitable for use in the wireless communications system described above, as well as other systems, will now be presented with reference to FIGS. 2A and 2B.

Referring to FIG. 2A, a signal source 202 generates information comprising encoded symbols and modulates a carrier signal with the information. The information may be encoded with convolutional codes, Turbo codes, or any other suitable coding scheme. The modulated carrier signal is then transmitted through a wireless channel 204 to a receiver 206.

At the receiver 206, the modulated carrier signal is processed by analog circuitry at the front end. A conceptual example of analog circuitry is shown in FIG. 2, which includes an antenna 208, a band pass filter (BPF) 210, a low noise amplifier (LNA) 212, a squarer 214, a low pass filter (LPF) 216, and a variable gain amplifier (VGA) 217. In this example, the modulated carrier signal is received at the antenna 208 and provided to the BPF 210 to remove out-of-band noise and interference received from the wireless channel 204. The filtered signal from the BPF 210 is provided to the LNA 212, which provides amplification with good noise performance. The amplified signal from the LNA 212 is then provided to the squarer 214. The squarer 214 is used to obtain the signal magnitude from the amplified signal. The squarer 214 may be implemented directly at RF, after down-conversion (not shown), or at an intermediate frequency. The signal from the squarer 214 is then provided to the LPF 216. Alternatively, the LPF 216 may be inherent in the squarer 214. The LPF 216 response may be fixed or adaptively controlled. The filtered signal output from the LPF 216 is provided to the VGA 217 for further amplification.

Figure 3:
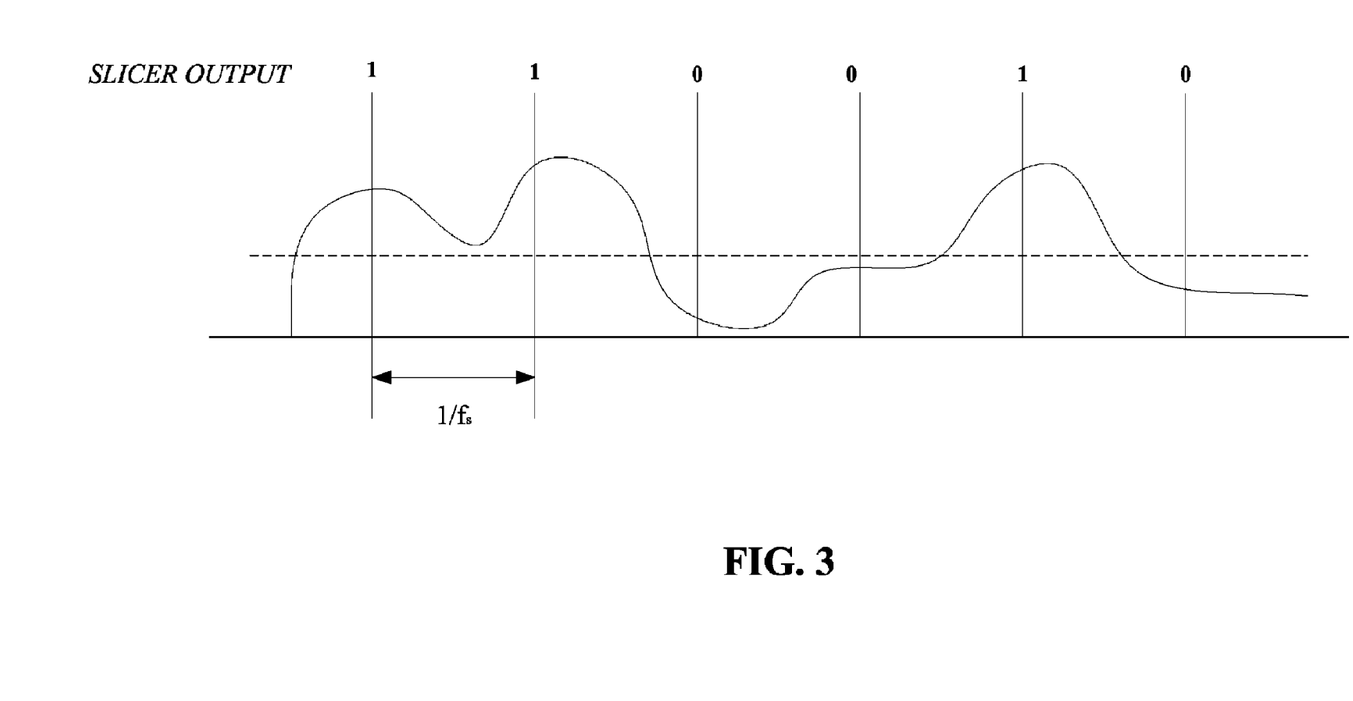
FIG. 3 is a simplified diagram illustrating an example of a decision process performed by a 1-bit slicer.

The signal output from the VGA 217 is sampled by a slicer 218. The slicer 218 in this example is a 1-bit slicer, but could be an N-bit slicer where N is an additional system design parameter. The 1-bit slicer makes 1-bit decisions regarding the signal at a sampling frequency fs. The sampling frequency may be fixed or adaptively controlled for performance optimization. As shown in FIG. 3, the 1-bit slicer makes a decision based on the magnitude of the signal at discreet points spaced apart in time by intervals of 1/fs. If the magnitude of the signal at a decision point is above a threshold value, the bit value for that sample is set to "1". If the magnitude is not greater than the threshold value, the bit value for that sample is set to "0".

The LNA gain, the VGA gain, and/or the slicer threshold may be adaptively modified to obtain an adequate performance during the reception of the information.

The sampled output from the slicer 218 is provided to a demodulator 220 to recover the data representative of the information carried by the signal transmitted by the signal source 202. The functionality of the demodulator 220 will be described in greater detail shortly. The data recovered by the demodulator 220 is provided to a decoder 224 to convert the data comprised of encoded symbols into a digital bit stream for further processing by a data sink 226. The specific implementation of the data sink 226 will depend on the particular application. By way of example, the data sink may be a transducer for a headset, a user interface for a watch, and a sensor for a sensing device.

The configuration of the demodulator 220 will depend upon the modulation scheme implemented at the signal source 202. As those skilled in the art will readily appreciate, the signal transmitted by the signal source 202 may be modulated by any of a multitude of well known modulation schemes. One example of a suitable modulation scheme is Binary PPM (BPPM), although the various concepts described herein can be extended to M-ary PPM or any constellation that can be fully or partially demodulated using non-coherent energy detection. BPPM is a modulation technique in which a bit of information is transmitted in every frame. By way of example, the frame may be divided into two halves, with each half having multiple time slots. In this example, the signal source 202 transmits a pulse in one of the time slots in the first half of the frame if the bit is a "0" and transmits a pulse in one of the time slots in the second half of the frame if the bit is a "1."

In some configurations, a time hopping technique may be used with BPPM. Time hopping is a spread spectrum technique in which a signal source transmits in a different slot in each frame. By way of example, the signal source 202 may transmit a pulse in a different time slot in each frame. The particular time slot in which the signal source 202 transmits the pulse in each frame is changed or randomized by a pseudo-random permutation sequence or pseudorandom noise (PN) code.

Synchronization between the signal source 202 and the receiver 206 may be necessary to determine the starting point of a frame. Time tracking algorithms may be used to maintain synchronization. In some configurations, the signal source 202 sends synchronizing pulses to the receiver 206 to maintain synchronization therewith. The synchronizing pulses may serve to operate timing circuits (not shown) in the receiver 206.

Turning to the demodulator 220, a digital integrator 221 and a subtractor 222 may be used to perform a demodulation function. The digital integrator 221 accumulates the samples from the slicer 218 at the two position hypothesis. The first position hypothesis occurs during the time slot in the frame where a pulse would be expected if the transmitted bit is "0" and the second hypothesis occurs during the time slot in the same frame where a pulse would be expected if the transmitted bit is "1". A time-tracking algorithm (not shown) may be used to determine where the first and second hypotheses occur within each frame based on the time hopping sequence. The window length (i.e., accumulation period) for each hypothesis depends on the specific application. Alternatively, or in addition to, the window length may be fixed or adaptively controlled.

In one configuration of the demodulator 221, two accumulator 221A and 221B are used: one for the first position hypothesis and one for the second position hypothesis. A subtractor 222 is used to compute a soft decision from the difference between the accumulated values (S2–S1) at the two hypothesis positions. A decoder 224 uses the soft decisions to decode the data bits that were originally transmitted by the signal source 202. The type of decoder 224 used will depend on the coding scheme used at the signal source 202. By way of example, a Viterbi or Turbo decoder may be required if the information was encoded at the signal source 202 with convolutional or Turbo codes, respectively.

Turning to FIG. 2B, an example of a receiver 206 will now be presented for receiving an un-coded modulated carrier signal from the signal source 202. The operation of the receiver 206 in this example is fundamentally the same as the receiver described earlier in connection with FIG. 2A, except that a hard decision is made at the demodulator 220. In at least one configuration of the demodulator 220, a comparator 223 may be used to determine the data bits that were originally transmitted by the signal source 202. More specifically, the output of the subtractor may be compared to "0". If the difference between the two accumulation values (S2–S1) is greater than "0", a hard decision is made that the transmitted bit is "1". Conversely, if the difference between the two accumulation values (S2–S1) is less than "0", a hard decision is made that the transmitted bit is "0".

The demodulator 220 may be implemented or performed with a general purpose processor, a microcontroller, a digital signal processor (DSP), an application specific integrated circuit (ASIC), a field programmable gate array (FPGA), a programmable logic device, a controller, a state machine, discrete hardware components, or any combination thereof, or other suitable entity or entities that can perform the various functions described throughout this disclosure. The demodulator 220 may also include, or be supported by, one or more machine-readable medium for storing software. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media includes any medium that facilitates transfer of software from one place to another. By way of example, machine-readable media may include RAM, ROM, EEPROM, CD-ROM or other optical disk storage, magnetic disk storage or other magnetic storage devices, or any other medium that can be used to carry or store software in the form of instructions or data structures and that can be accessed by the processing system. Also, any connection is properly termed a machine-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of machine-readable media.

Figure 4:
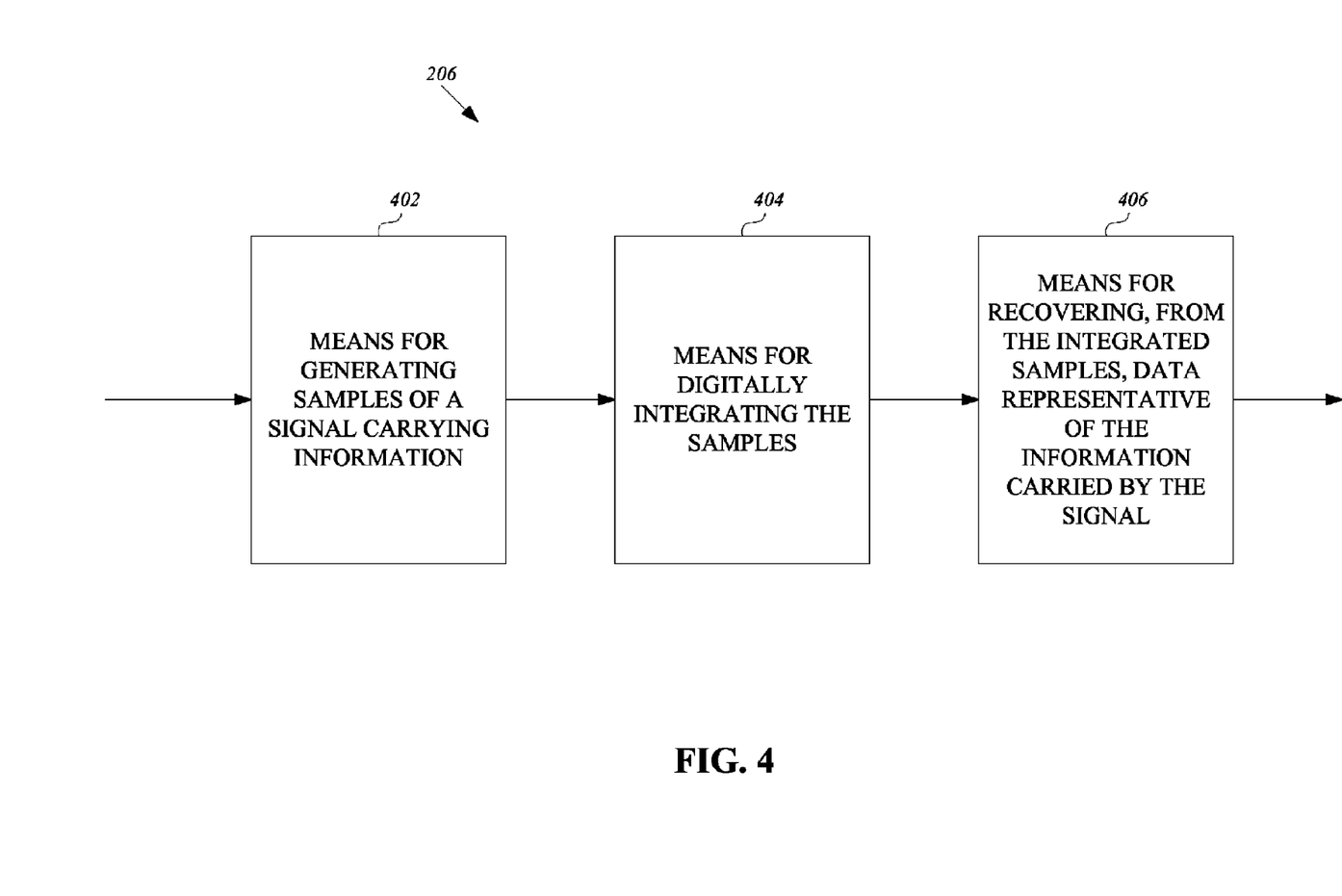
FIG. 4 is a conceptual block diagram illustrating an example of the functionality of the receiver.

FIG. 4 is a conceptual block diagram illustrating an example of the functionality of the receiver 206. In this example, the receiver 206 includes means 402 for generating samples of a signal carrying information. This function may be performed by the slicer 218 described above. The receiver 206 also includes means 404 for digitally integrating the samples. This function may be performed by the digital integrator 221 described above. The receiver further comprises means 406 for recovering, from the integrated samples, data representative of the information carried by the signal. This function may be performed by the subtractor 222 and decoder 224 as described with reference to FIG. 2A, or the subtractor 222 and comparator 223 as described with reference to FIG. 2B.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more," and wherein reference to "at least" one of two elements (i.e., first and second elements) means the first element, the second element, or the first and second element. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus, comprising:
 a slicer configured to generate samples of a pulse position modulated signal carrying information; and
 a demodulator comprising:

a digital integrator configured to integrate the samples by accumulating the samples at first and second position hypotheses based on the pulse position modulated signal; and a subtractor configured to compute a difference between the accumulated samples at the first and second position hypotheses, wherein data representative of the information carried by the signal is recovered based on said difference.

2. The apparatus of claim 1 wherein the digital integrator comprises a first accumulator configured to accumulate the samples at the first position hypothesis and a second accumulator configured to accumulate the samples at the second position hypothesis.

3. The apparatus of claim 1 wherein the information carried by the signal is encoded, and wherein the data recovered by the demodulator includes a soft decision comprising the difference computed by the subtractor.

4. The apparatus of claim 1 wherein the information carried by the signal is uncoded, and wherein the data recovered by the demodulator includes a hard decision based on the difference computed by the subtractor.

5. The apparatus of claim 4 wherein the demodulator further comprises a comparator configured to generate the hard decision by comparing the difference computed by the subtractor with a threshold.

6. The apparatus of claim 1 wherein the digital integrator is further configured to vary a time period for at least one of the first and second position hypotheses.

7. The apparatus of claim 1 wherein the slicer is configured to vary a sampling frequency for sampling the signal.

8. The apparatus of claim 1 wherein the slicer comprises a 1-bit slicer.

9. The apparatus of claim 1 wherein the slicer comprises an N-bit slicer, N being an integer greater than one.

10. The apparatus of claim 1 further comprising a squarer configured to perform a squaring operation on the signal, wherein the samples are generated from the squared signal.

11. The apparatus of claim 10 further comprising a low pass filter configured to filter the squared signal.

12. A method for wireless communications, comprising:
generating samples of a pulse position modulated signal carrying information;
integrating the samples by accumulating the samples at a first position hypothesis and accumulating the samples at a second position hypothesis based on the pulse position modulated signal; and
recovering, from the integrated samples, data representative of the information carried by the signal by computing a difference between the accumulated samples at the first and second position hypotheses.

13. The method of claim 12 wherein the information carried by the signal is encoded, and wherein the recovery of the data includes making a soft decision comprising the computed difference.

14. The method of claim 12 wherein the information carried by the signal is uncoded, and wherein the recovery of the data includes making a hard decision based on the computed difference.

15. The method of claim 14 wherein the making of the hard decision comprises comparing the computed difference with a threshold.

16. The method of claim 12 wherein the integrating of the samples further comprises varying a time period for at least one of the first and second position hypotheses.

17. The method of claim 12 wherein the generating of the samples comprises varying a sampling frequency for sampling the signal.

18. The method of claim 12 further comprising squaring the signal, wherein the samples are generated from the squared signal.

19. The apparatus of claim 18 further comprising low pass filtering the squared signal.

20. An apparatus, comprising:
means for generating samples of a signal carrying information;
means for digitally integrating the samples; and
means for recovering from the integrated samples data representative of the information carried by the signal.

21. The apparatus of claim 20 wherein the signal is a pulse position modulated signal.

22. The apparatus of claim 21 wherein the means for digitally integrating the samples comprises means for accumulating the samples at first and second position hypotheses.

23. The apparatus of claim 22 wherein the means for digitally integrating the samples further comprises means for accumulating the samples at the first position hypothesis and means for accumulating the samples at the second position hypothesis.

24. The apparatus of claim 22 wherein the means for recovering the data comprises means for computing a difference between the accumulated samples at the first and second position hypotheses.

25. The apparatus of claim 24 wherein the information carried by the signal is encoded, and wherein the means for the recovering the data further comprises means for making a soft decision comprising the computed difference.

26. The apparatus of claim 24 wherein the information carried by the signal is uncoded, and wherein the means for the recovering the data further comprises means for making a hard decision based on the computed difference.

27. The apparatus of claim 26 wherein the means for making a hard decision comprises means for comparing the computed difference with a threshold.

28. The apparatus of claim 22 further comprising means for varying a time period for at least one of the first and second position hypotheses.

29. The apparatus of claim 20 wherein the means for generating the samples comprises means for varying a sampling frequency for sampling the signal.

30. The apparatus of claim 20 wherein the means for generating samples comprises a 1-bit slicer.

31. The apparatus of claim 20 wherein the means for generating samples comprises an N-bit slicer, N being an integer greater than one.

32. The apparatus of claim 20 further comprising means for performing a squaring operation on the signal, wherein the samples are generated from the squared signal.

33. The apparatus of claim 32 further comprising means for low pass filtering the squared signal.

34. A computer-program product for wireless communications, comprising:
a non-transitory computer-readable medium comprising codes executable to:
integrate the samples of a pulse position modulated signal carrying information by accumulating the samples at a first position hypothesis and accumulating samples at a second position hypothesis based on the pulse position modulated signal, and
recover, from the integrated samples data representative of the information carried by the signal by computing a difference between the accumulated samples at the first and second position hypotheses.

35. A headset, comprising:

a slicer configured to generate samples of a pulsed position modulated signal carrying information;

a demodulator comprising:

a digital integrator configured to integrate the samples by accumulating the samples at first and second position hypotheses based on the pulse position modulated signal; and     a subtractor configured to compute a difference between the accumulated samples at the first and second position hypotheses, wherein data representative of the information carried by the signal is recovered based on said difference; and a transducer configured to generate sound based on the data.

36. A watch, comprising:

a slicer configured to generate samples of a pulsed position modulated signal carrying information;

a demodulator comprising:

a digital integrator configured to integrate the samples by accumulating the samples at first and second position hypotheses based on the pulse position modulated signal; and     a subtractor configured to compute a difference between the accumulated samples at the first and second position hypotheses, wherein data representative of the information carried by the signal is recovered based on said difference; and a user interface configured to provide an indication based on the data.

37. A sensing device, comprising:

a slicer configured to generate samples of a pulsed position modulated signal carrying information;

a demodulator comprising:

a digital integrator configured to integrate the samples by accumulating the samples at first and second position hypotheses based on the pulse position modulated signal; and     a subtractor configured to compute a difference between the accumulated samples at the first and second position hypotheses, wherein data representative of the information carried by the signal is recovered based on said difference; and a sensor configured to generate data based on the data from the demodulator.

\* \* \* \* \*

UNITED STATES PATENT AND TRADEMARK OFFICE
CERTIFICATE OF CORRECTION

Page 1 of 1

PATENT NO. : 7,868,689 B2
APPLICATION NO. : 12/099686
DATED : January 11, 2011
INVENTOR(S) : Lee et al.

It is certified that error appears in the above-identified patent and that said Letters Patent is hereby corrected as shown below:

Column 08, line 07, claim 19: "The apparatus" to read as --The method--

Column 08, line 66, claim 34: "data" to read as --data,--

Signed and Sealed this
Twelfth Day of July, 2011

David J. Kappos
*Director of the United States Patent and Trademark Office*